(12) United States Patent
Olsson

(10) Patent No.: US 9,365,127 B2
(45) Date of Patent: Jun. 14, 2016

(54) RECHARGING ELECTRIC VEHICLES

(75) Inventor: Mats Olsson, Austin, TX (US)

(73) Assignee: Wayne Fueling Systems LLC, Austin, TX (US)

(*) Notice: Subject to any disclaimer, the term of this patent is extended or adjusted under 35 U.S.C. 154(b) by 902 days.

(21) Appl. No.: 12/944,852

(22) Filed: Nov. 12, 2010

(65) Prior Publication Data

US 2011/0115425 A1 May 19, 2011

Related U.S. Application Data

(60) Provisional application No. 61/261,248, filed on Nov. 13, 2009.

(51) Int. Cl.
*H02J 7/00* (2006.01)
*B60L 11/18* (2006.01)
*B60L 3/00* (2006.01)
(Continued)

(52) U.S. Cl.
CPC .......... *B60L 11/1824* (2013.01); *B60L 3/0046* (2013.01); *B60L 3/04* (2013.01); *B60L 8/003* (2013.01); *B60L 8/006* (2013.01); *B60L 11/185* (2013.01); *B60L 11/1861* (2013.01); *B60L 2200/26* (2013.01); *B60L 2210/10* (2013.01); *B60L 2210/30* (2013.01); *Y02T 10/7005* (2013.01); *Y02T 10/705* (2013.01); *Y02T 10/7044* (2013.01); *Y02T 10/7072* (2013.01); *Y02T 10/7083* (2013.01); *Y02T 10/7216* (2013.01); *Y02T 10/7241* (2013.01); *Y02T 90/121* (2013.01); *Y02T 90/127* (2013.01); *Y02T 90/128* (2013.01); *Y02T 90/14* (2013.01)

(58) Field of Classification Search
CPC ........ H02J 3/382; H02J 7/1492; Y02T 90/12; G06Q 20/085
USPC .............................. 320/101, 123, 109; 705/77
See application file for complete search history.

(56) References Cited

U.S. PATENT DOCUMENTS 5,272,378 A * 12/1993 Wither .......................... 290/1 R
5,296,799 A * 3/1994 Davis ...................... H02J 9/066
290/52

(Continued)

FOREIGN PATENT DOCUMENTS

DE 4121386 A1 1/1993
DE 9404746 U1 6/1994
(Continued)

OTHER PUBLICATIONS

PCT Search Report and Written Opinion dated Jun. 19, 2012 from corresponding Application No. PCT/US2010/056544.
(Continued)

*Primary Examiner* — Richard Isla Rodas
*Assistant Examiner* — Johali Torres Ruiz
(74) *Attorney, Agent, or Firm* — Mintz Levin Cohn Ferris Glovsky and Popeo, P.C.

(57) ABSTRACT

A charge transfer apparatus having an input and an output includes: an AC/DC converter coupled to the input of the charge transfer apparatus and configured to receive AC power at a first power level; and a charge storage device coupled to the AC/DC converter, where the charge storage device is configured to receive charge at the first power level and to transfer charge to the output of the charge transfer apparatus at a second power level, and the second power level is greater than the first power level.

7 Claims, 5 Drawing Sheets

(51) Int. Cl.
*B60L 3/04* (2006.01)
*B60L 8/00* (2006.01)

(56) References Cited

U.S. PATENT DOCUMENTS

| | | | |
|---|---|---|---|
| 5,617,003 A | 4/1997 | Odachi et al. | |
| 5,631,536 A * | 5/1997 | Tseng | 320/137 |
| 6,232,582 B1 * | 5/2001 | Minnear | H05B 1/0263 219/481 |
| 7,482,710 B2 * | 1/2009 | Ichinose | H02J 9/08 307/67 |
| 7,573,230 B2 * | 8/2009 | Dickson et al. | 320/107 |
| 7,692,409 B2 * | 4/2010 | Schaper | H02J 3/00 320/132 |
| 2002/0198648 A1 * | 12/2002 | Gilbreth | H02J 1/10 701/100 |
| 2005/0206346 A1 * | 9/2005 | Smith et al. | 320/132 |
| 2006/0017328 A1 * | 1/2006 | Bryde | H02J 9/061 307/64 |
| 2007/0079611 A1 * | 4/2007 | Doland | C25B 1/04 60/495 |
| 2007/0274113 A1 * | 11/2007 | Wang et al. | 363/109 |
| 2008/0088200 A1 * | 4/2008 | Ritchey | 310/268 |
| 2008/0185991 A1 * | 8/2008 | Harris | B60L 11/1818 320/109 |
| 2009/0096426 A1 | 4/2009 | Schaper et al. | |
| 2009/0177595 A1 * | 7/2009 | Dunlap | B60L 11/1824 705/412 |
| 2009/0326749 A1 * | 12/2009 | Uchida | 701/22 |
| 2010/0039062 A1 * | 2/2010 | Gu | B60L 8/003 320/101 |
| 2010/0181957 A1 * | 7/2010 | Goeltner | B60L 8/003 320/101 |
| 2010/0225266 A1 * | 9/2010 | Hartman | B60L 11/1822 320/101 |
| 2011/0055037 A1 * | 3/2011 | Hayashigawa | B60L 3/0069 705/26.1 |

FOREIGN PATENT DOCUMENTS

| | | |
|---|---|---|
| DE | 19520603 C1 | 8/1996 |
| EP | 2065718 A1 | 6/2009 |
| GB | 2281642 A | 3/1995 |
| WO | 98/44614 A1 | 10/1998 |
| WO | 01/11765 A1 | 2/2001 |
| WO | 2009014543 A1 | 1/2009 |

OTHER PUBLICATIONS

PCT Invitation to Pay Additional Fees dated Mar. 7, 2012 from corresponding Application No. PCT/US2010/056544.
Unofficial English translation of CN Office Action issued Apr. 3, 2014 in connection with corresponding CN Patent Application No. 201080050933.1.

* cited by examiner

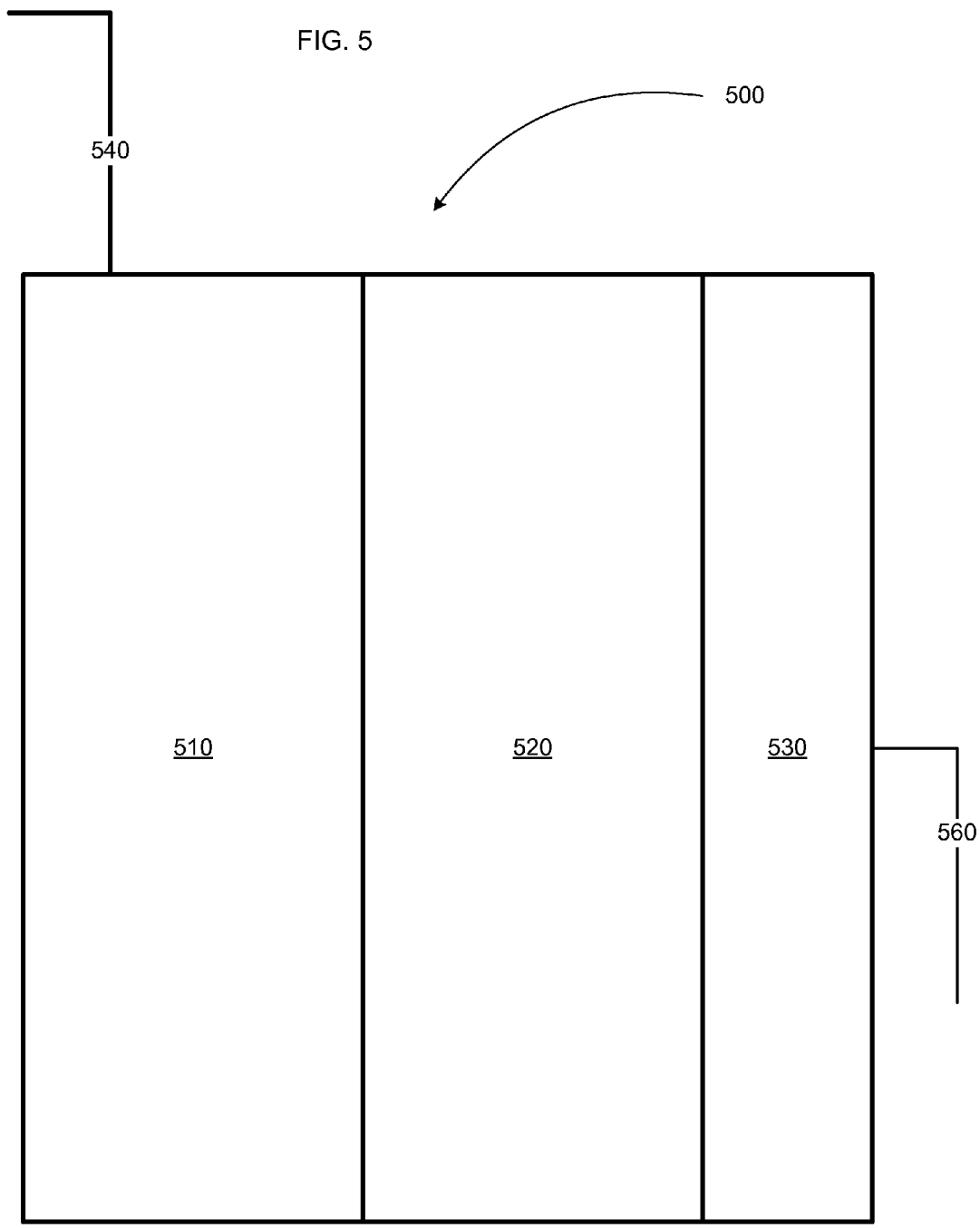

RECHARGING ELECTRIC VEHICLES

CLAIM OF PRIORITY

This application claims priority under 35 U.S.C. §119(e) to U.S. Provisional Patent Application Ser. No. 61/261,248, filed on Nov. 13, 2009, the entire contents of which are hereby incorporated by reference.

TECHNICAL BACKGROUND

This disclosure relates to recharging electric and/or hybrid vehicles and, more particularly, to recharging electric and/or hybrid vehicles at a fueling facility through a dispenser.

BACKGROUND

Recent economic, environmental, and national security concerns have led to an increase in demand for more fuel efficient vehicles, and thus, less dependence on foreign oil and reduced carbon emissions. As a result, car manufacturers have incorporated a variety of technologies to improve gas mileage and/or reduce carbon emissions. One of the competing technologies in this space relies on the use of battery packs to provide power to an electric motor. A significant amount of research is currently being performed to improve the charge density of batteries in order to improve both the performance and range of battery powered vehicles. At present, a typical range for an electric vehicle is about 100-200 miles (depending on the terrain and driving conditions) before recharge. Further, the amount of time required to fully charge a battery pack typically ranges between 4 to 8 hours. Still further, charging to an 80% state of charge (S.O.C.) typically requires at least 30 minutes. In comparison, a gasoline vehicle having a 16 gallon tank and a gas mileage rate of 26 miles/gallon has a range of over 400 miles and typically, can be filled up at a refueling station in less than 10 minutes. Thus, research is also being performed to improve charging rates of batteries to enable recharge rates as high as 10 C-15 C (6 minute to 4 minute recharge times), and preferably higher.

Even at today's battery charge density, a large amount of power would be required to charge a battery pack at a 10 C rate. For example, the Tesla Roadster operates on a Li-ion battery pack that stores 53 kilowatt-hours (kWh) of electrical energy. In order to charge the battery pack to 80% S.O.C. ("quick charge") at a 10 C rate (i.e., 6 minutes), 424 kW must generated by a power source over a period of six minutes. Assuming a power source provides 120 VAC, single phase power (as is typical in most residential homes), and a power factor of 1.0, approximately 3500 Amps would be required to generate the 424 kW necessary to perform the 10 C quick charge. Assuming a power source provides 208 VAC, three phase power (as is typical in commercial installations), and a power factor of 1.0, approximately 1177 Amps would be required to generate the power necessary for the 10 C quick charge.

As battery charge density and charge rates improve, electric vehicle performance will likely improve leading to more mainstream acceptance of battery powered vehicles. The expected result of such an advancement is greater dependence on utility companies to provide power to recharge the vehicles. In view of the recent increase in power outages due to increased load demands, line faults, and/or bad weather, it is evident that the current grid infrastructure will be unable to support such an increase in demand. Further, the amount of power necessary to perform a quick charge, coupled with the reality of daily driving is likely to lead to increased power generation requirements during the peak demand periods. Still further, assuming power generation capacity is increased to meet this demand, the increase in power demand is likely to require significant investment in the grid infrastructure.

Thus, a need exists for providing high power charging stations capable of providing improved charging rates and power output for battery power vehicles, including, for example, electric vehicles and hybrid vehicles.

SUMMARY

In one general embodiment, a charge transfer apparatus is configured to perform quick charge operations on battery powered vehicles and includes: at least one generator configured to supply electrical power at a medium power recharge level or high power recharge level while electrically decoupled from a utility power grid; an AC/DC converter configured to transform an alternating electrical current of the electrical power to a direct electrical current; and a DC transfer conduit coupled to the converter and configured to recharge a vehicle battery pack with the direct electrical current.

In another general embodiments, a method for quick charging a battery powered vehicle by a high power charge transfer apparatus includes: generating electrical power at a medium power recharge level or high power recharge level by a generator; transforming the electrical power from an alternating electrical current to a direct electrical current with an AC/DC converter; transferring the direct electrical current from the generator to a vehicle battery pack through a DC transfer conduit to recharge the battery pack while the generator is electrically decoupled from a utility power grid.

In another general embodiment, a charge transfer apparatus having an input and an output includes: an AC/DC converter coupled to the input of the charge transfer apparatus and configured to receive AC power at a first power level; and a charge storage device coupled to the AC/DC converter, where the charge storage device is configured to receive charge at the first power level and to transfer charge to the output of the charge transfer apparatus at a second power level, and the second power level is greater than the first power level.

In one or more specific aspects of one or more general embodiments, an apparatus may further include a battery pack coupled between the AC/DC converter and the DC transfer conduit; and a DC/DC converter coupled between the battery pack and the DC transfer conduit.

In one or more specific aspects of one or more general embodiments, the battery pack may include one or more batteries configured in series or parallel.

In one or more specific aspects of one or more general embodiments, the medium power recharge level may include an alternating electrical current at approximately 240 VAC, 15-70 A, and 3.6-16.8 kW.

In one or more specific aspects of one or more general embodiments, the high power recharge level may include an alternating electrical current at approximately 480 VAC.

In one or more specific aspects of one or more general embodiments, an apparatus may further include a primary mover coupled to the generator and configured to supply torque to a rotor of the generator.

In one or more specific aspects of one or more general embodiments, an apparatus may further include control logic configured to receive operating parameters for charging the vehicle battery pack and to adjust a DC output of the apparatus based in part on the received operating parameters.

In one or more specific aspects of one or more general embodiments, the operating parameters may include at least two of a maximum SOC, a maximum charge rate, a maximum amperage, a maximum operating voltage of the vehicle battery pack, a nominal operating voltage of the vehicle battery pack, a maximum charge capacity of the vehicle battery pack, and a current SOC of the vehicle battery pack.

In one or more specific aspects of one or more general embodiments, the operating parameters may include charge acceptance characteristics and/or a temperature of the vehicle battery pack.

In one or more specific aspects of one or more general embodiments, an apparatus may further include a bidirectional communication link configured to transmit and receive data between the apparatus and the battery powered vehicle.

In one or more specific aspects of one or more general embodiments, the data may include at least one of instantaneous voltage of the direct electrical current, instantaneous current of the direct electrical current, and instantaneous kilowatt output from the apparatus to the vehicle battery pack.

In one or more specific aspects of one or more general embodiments, the data may include purchased retail data for download to the battery powered vehicle.

In one or more specific aspects of one or more general embodiments, the data may include status information indicating a start or stop of a charge cycle of the battery powered vehicle.

In one or more specific aspects of one or more general embodiments, the data may be provided to the battery powered vehicle to prevent the vehicle from starting during the charge cycle.

In one or more specific aspects of one or more general embodiments, the DC transfer conduit is a first DC transfer conduit, and the apparatus may further include a second DC transfer conduit configured to be coupled to a second vehicle battery pack of a second battery powered vehicle.

In one or more specific aspects of one or more general embodiments, the primary mover may be a combustion engine or a turbine.

In one or more specific aspects of one or more general embodiments, the generator may include: a low power recharge bus electrically coupled to the utility power grid; a first switch electrically coupled to the low power recharge bus; a second switch electrically coupled to the AC/DC converter; and a battery array including a plurality of batteries coupled between the first and second switches. The battery array may be configured to receive electrical power at a low power recharge level from the utility power grid when coupled to the low power recharge bus through the first switch, and supply the electrical power at the medium power recharge level or high power recharge level when coupled to the AC/DC converter through the second switch while the first switch is open between the low power recharge bus and the battery array.

In one or more specific aspects of one or more general embodiments, at least some of the plurality of batteries may include recycled batteries configured to power battery powered vehicles.

In one or more specific aspects of one or more general embodiments, the low power recharge level may include an alternating electrical current at approximately 120 VAC, 15 A, and 1.8 kW.

In one or more specific aspects of one or more general embodiments, the generator may include a fuel cell.

In one or more specific aspects of one or more general embodiments, an apparatus may further include an actuator configured to retract at least a portion of the DC transfer conduit into a housing of the apparatus.

In one or more specific aspects of one or more general embodiments, a method may further include: transforming the first DC current to a second DC current with a DC/DC converter; and charging the battery pack with the second DC current.

In one or more specific aspects of one or more general embodiments, a method may further include applying a torque to the generator with a primary mover coupled to the generator.

In one or more specific aspects of one or more general embodiments, a method may further include receiving operating parameters for charging the vehicle battery pack; and adjusting the direct electrical current based in part on the received operating parameters.

In one or more specific aspects of one or more general embodiments, a method may further include: transmitting data to the battery powered vehicle through a bidirectional communication link; and receiving data from the battery powered vehicle through the bidirectional communication link.

In one or more specific aspects of one or more general embodiments, a method may further include: transmitting a signal to the battery powered vehicle to substantially prevent starting of the vehicle during the charge cycle.

In one or more specific aspects of one or more general embodiments, a method may further include: receiving electrical power at the battery array at a low power recharge level from the utility power grid when the first switch is closed coupled to the low power recharge bus through the first switch; charging the battery array with the electrical power at the low power recharge level; and supplying the electrical power at the medium power recharge level or high power recharge level when the second switch is closed and while the first switch is open between the low power recharge bus and the battery array.

In one or more specific aspects of one or more general embodiments, a method may further include providing a fuel to the primary mover in response to a torque applied to a rotor of the generator by the primary mover.

In one or more specific aspects of one or more general embodiments, the charge storage device may include a battery array configured to be controllably discharged through the output of the charge transfer apparatus.

In one or more specific aspects of one or more general embodiments, the battery array may include multiple batteries electrically coupled in a series-parallel arrangement.

In one or more specific aspects of one or more general embodiments, the output of the charge transfer apparatus may be a first output, and the charge transfer apparatus may further include a second output.

In one or more specific aspects of one or more general embodiments, the charge storage device may be configured to transfer charge to the first and second outputs in parallel using time multiplexing.

In one or more specific aspects of one or more general embodiments, an apparatus may further include a generator coupled in parallel to the charge storage device and operable to transfer charge to the charge storage device.

Various implementations of a vehicle charging system according to the present disclosure may include one or more of the following features. For example, the vehicle charging system may provide a quick recharge (e.g., medium and/or high power recharge) to a vehicle without negatively impacting a utility power grid. The vehicle charging system, for instance, may provide the quick recharge while electrically decoupled from the utility power grid. As another example, the vehicle charging system may utilize existing fuel dispenser technology (e.g., housings, foundations, communications, payment options, and otherwise) while providing the quick recharge. The vehicle charging system may also utilize existing proven technology to generate power for the quick recharge (e.g., natural gas engines, wind turbines, nuclear power, steam turbine generators, natural gas microturbines, and otherwise). The vehicle charging system may also rely on co-generation techniques, such as utilizing waste heat to generate hot water, steam, or otherwise, while providing the quick recharge. The vehicle charging system may also provide quick recharge to a vehicle without adding or improving electrical capacity or electrical grid infrastructure. In addition, the vehicle charging system located at a dedicated recharging location may offer medium level recharge at nearby locations (e.g., parking lots, offices, communities) while a high power recharge is idle. The vehicle charging system may also utilize two-way communication between a vehicle fuel dispenser and power generation equipment; the dispenser and the vehicle; the dispenser and a point-of-sale system; and the dispenser and remote payment systems (to name but a few).

Various implementations of a vehicle charging system according to the present disclosure may also include one or more of the following features. For example, the vehicle charging system may utilize dynamic real-time load management where a total available energy is time-correlated with an amount of energy a particular vehicle or group of vehicles can receive. The vehicle charging system may also utilize renewable energy (e.g., wind, hydroelectric, solar, biogas, or otherwise) as a primary quick recharge power source. Further, the vehicle charging system may also utilize "second-use" technology, such as recycled lithium-ion batteries, as a primary power source for quick recharge of a vehicle. The vehicle charging system may also utilize a processor-based software control system to manage quick recharge of vehicles. For instance, the control system may monitor, store, and manage historical quick charge speed patterns, times, and other data according to one or more business rules to more efficiently provide quick recharge services. Further, the control system may offer and provide additional consumer products and services (e.g., media, food and drinks, and otherwise) during quick recharge of vehicles. The control system may also notify (e.g., by email, text message, or otherwise) a vehicle owner when the quick recharge of the vehicle is complete or nearly complete, as well as when other services are available.

Various implementations of a vehicle charging system according to the present disclosure may also include one or more of the following features. For example, the vehicle charging system may include time-multiplexing capabilities to, for example, maintain vehicle battery temperature below a maximum threshold temperature, simultaneously quick charge alternating groups of vehicles within a plurality of vehicles in a given time period, and otherwise. For instance, three groups of vehicles may alternatively charge for 5 second intervals over a 15 second time period, thereby allowing each vehicle to quick charge at a high level for 5 seconds and idle for 10 seconds, thereby maintaining vehicle battery temperature. Further, by multiplexing the quick charging of groups of vehicles, existing power generation equipment (e.g., batteries, generators, electrical grids) may not need to be modified and/or improved.

These general and specific aspects may be implemented using a device, system or method, or any combinations of devices, systems, or methods. The details of one or more implementations are set forth in the accompanying drawings and the description below. Other features, objects, and advantages will be apparent from the description and drawings, and from the claims.

DESCRIPTION OF DRAWINGS

FIG. 5 is a block diagram illustrating one example embodiment of a fuel (e.g., electricity, charged fluid) dispenser.

DETAILED DESCRIPTION

Figure 1:
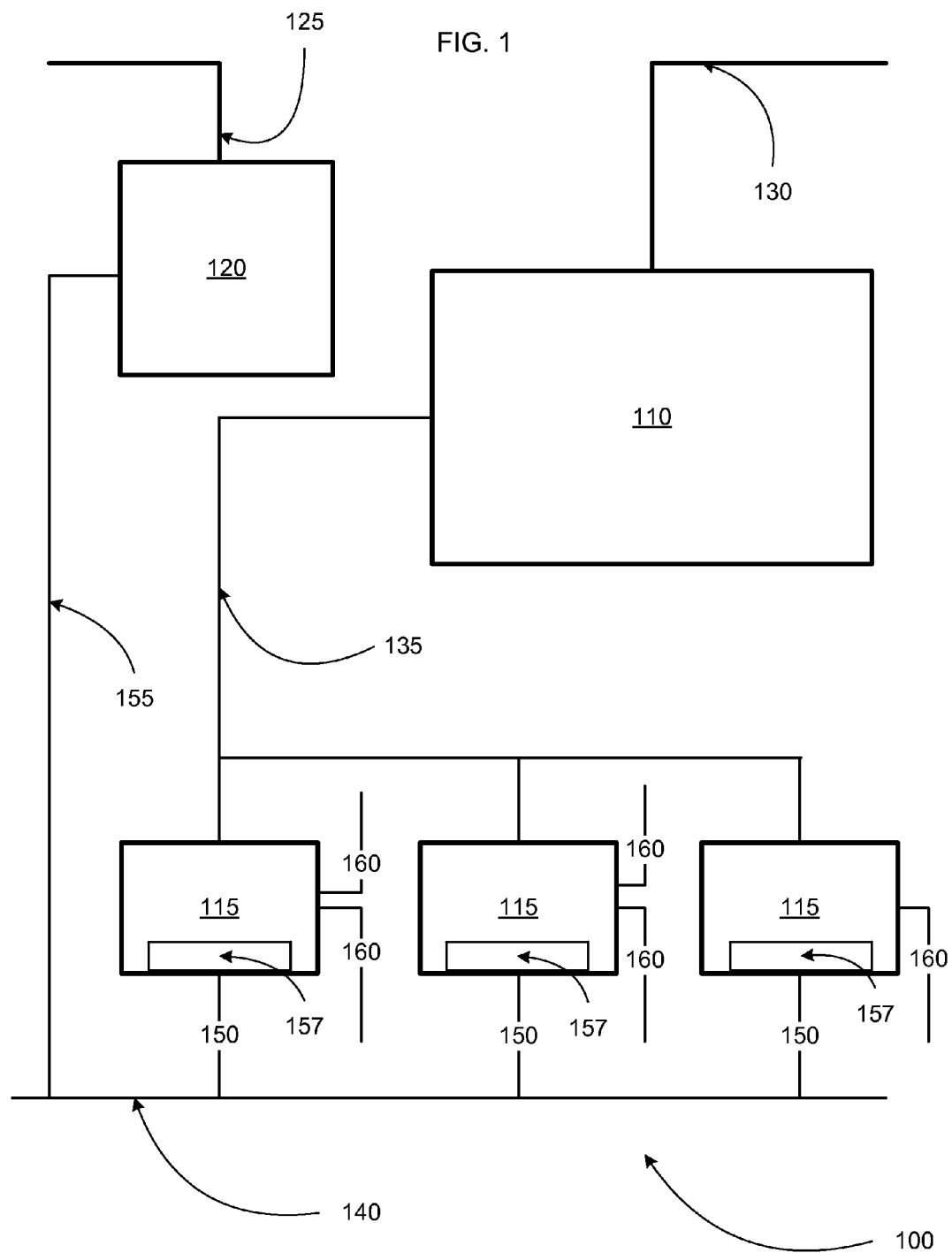
FIG. 1 is a block diagram illustrating one example embodiment of a fueling facility operable to recharge an electric and/or hybrid vehicle utilizing a facility power generator.

FIG. 1 is a block diagram illustrating one example embodiment of a fueling facility 100 operable to recharge an electric and/or hybrid vehicle (not shown) utilizing a facility power generator 120. Such a vehicle, for example, may be a parallel hybrid vehicle. For example, a parallel hybrid may include a battery and an electric motor/generator delivering power on a rotating shaft in parallel with a combustion engine delivering power in the more traditional fashion. Parallel hybrids often have better gas mileage, especially in urban traffic areas, in part due to brake energy used to run the motor as a generator to recharge the battery. Parallel hybrids may use gasoline, diesel, or ethanol. In addition, parallel hybrids may be light hybrids, or micro hybrids. For example, by replacing a belt driven alternator with a module serving as both the alternator and an assisting motor, gas mileage may be improved when the car is accelerating. For instance, used in conjunction with modern clean diesel technology, such vehicles may approach gas mileages of 100 miles per gallon. In addition, parallel hybrids may include an electrical connection to allow charging of the battery from a power outlet.

Vehicles that may utilize system 100 may also include series hybrids. Series hybrids, typically, have an electric drive train with one or more motors and a battery as the only drive train, thereby eliminating the need for a regular transmission. The motors may also serve as a generator feeding the battery to capture brake energy when the car is decelerating. Series hybrids may also be equipped with a combustion engine as a range extender. The range extender may include a generator charging the battery when the battery approaches low levels. Subject to the size of the battery, such a car may be able to operate for up to 40 miles without need for the combustion engine. Such a vehicle often includes an onboard battery charger for low to medium charge levels, so that the car may be plugged into an AC outlet with 120 VAC, 15 A or 240 VAC, 15 A power supply.

In addition, vehicles that may utilize system 100 may include electric vehicles. Electric vehicles may be similar to series hybrids but without the combustion engine and its associated generator. The battery of an electric vehicle, typically, may also be larger to enable drive distances above, for example, 40 miles.

Each of the aforementioned vehicles that may utilize system 100 may include a variety of different battery technologies. For example, many such vehicles may utilize lithium ion battery technology. As a further example, such vehicles may utilize batteries using lithium oxygen batteries. As a further example, such vehicles may utilize batteries containing a fluid (e.g., liquid, gel, or other fluid) containing an electric charge. Super capacitors may also be used instead of batteries.

Regardless of the battery technology, such batteries will need to be recharged in order to obtain additional drive cycles from the vehicle. While some car owners will be able to charge their cars at home at a slow rate corresponding to 0.12 miles/minute (e.g., at 120 VAC, 15 A), others may be able to charge in some public areas at speeds up to 1.12 miles/minute (e.g., at 240 VAC, 70 A). For example, recharge levels in the United States may include Level 1 at 120 VAC, 15 A, 1.8 kW (i.e., low power recharge); Level 2 at 240 VAC, 15-70 A, 3.6-16.8 kW (i.e., medium power recharge); and Level 3 at 460-480 VDC (i.e., high power recharge). Recharge levels in Europe, as another example, may include a first level recharge at 230 VAC, 16 A, 3.7 kW, and a second level recharge at 400 VAC, 16-63 A, and 11-43.5 kW. As used herein, "quick recharge" may refer to medium and/or high power recharge (i.e., Level 2 and Level 3 recharge, respectively), while "slow recharge" may refer to low power recharge (Level 1 recharge).

Quicker recharge speeds may be useful to offer a consumer the flexibility and convenience associated with modern life. As described above, the present utility grid and power generation infrastructure may not be able to provide the amount of power necessary for performing a quick recharge for a large number of vehicles at various locations within the community. This problem is exacerbated by the peak demands typically associated with afternoon temperatures and daily business operations. Because hybrids include combustion engines for supplementing power supplied to the vehicle, the battery packs included in these vehicles are typically smaller in capacity than electric vehicles.

For example, a Toyota Prius battery pack operates at a nominal voltage of 201.6V and is capped at a capacity of 6.5 Ah (i.e., the maximum S.O.C. is limited to extend battery life). Thus, the amount of power necessary to charge the Prius battery pack in 1 hour is approximately 1.3 kW. In order to provide a 10 C quick charge (e.g., to the maximum allowed S.O.C.), 13 kW of power would need to be generated for six minutes. Thus, a single phase 120 VAC power source would need to draw approximately 110 Amps, and a 240 VAC, single phase power source would need to draw approximately 55 Amps to charge the battery pack in 6 minutes. As described above, the amount of power necessary to quick charge an electric vehicle is significantly larger. In the case of a Tesla Roadster, approximately 3500 Amps and 1177 Amps would be necessary to perform a quick charge using a 120 VAC, single phase power source and a 208 VAC, three phase power source, respectively. As described in further detail below, system 100 is configured to generate sufficient power to supply a quick recharge to battery powered vehicles without the need for significant improvements to the utility grid infrastructure, e.g., due to increased load demands during peak demand periods.

As illustrated, system 100 includes a point of sale (POS) facility 110, a facility generator 120, and one or more fuel dispensers 115. As used here in, a "fuel dispenser" may include any dispensing device operable to dispense a fuel (e.g., electrical power, a charged fluid, or other non-hydrocarbon fuel) to a vehicle. In addition, the present disclosure contemplates that a "vehicle" includes any personal and/or commercial vehicle, such as a car, a van, truck, SUV, ATV, motorcycle, motorbike, or other powered vehicle able to transport people and/or things from one place to another. In one embodiment, the system 100 may be located at a commercial fueling station. In another embodiment, the system 100 may be located at a fleet fueling center. In another embodiment, the system 100 may be located at a retail center, such as a "big box" store or other retail store. In any event, the system 100 may also represent one or more of the aforementioned facilities.

The POS facility 110, at a high-level, is any facility in which one or more commercial and/or retail transactions may occur, be completed, or be transmitted through. For example, the POS facility 110 may provide for the sale of commercial goods, such as food items, drink items, other personal items, as well as fuel dispensed by one or more of the dispensers 115. The POS facility 110 may also include one or more apparatus to facilitate such commercial and/or retail transactions, such as a forecourt controller, and other apparatus that may receive transaction data (e.g., from the dispensers 115 or other apparatus), store transaction data (e.g., in one or more memories and/or databases), and/or transmit transaction data (e.g., to another fueling facility, a payment card issuer, a payment verification center, or other location).

As illustrated, the POS facility 110 may be communicably coupled to one or more of the dispensers 115 via a communication link 135. The communication link 135 may provide for and/or facilitate the exchange of electronic data, such as transaction data, between the dispensers 115 and the POS facility 110. For example, the communication link 135 may facilitate for the transmission of electronic data over any appropriate wired connection and/or wireless connection as well as any appropriate communication protocol. In other words, the present disclosure contemplates that any existing and/or future communication techniques, be they wired, wireless, optical, or otherwise, may be utilized with the POS facility 110 and dispensers 115. In addition, similar communication links to communication link 135 may communicably couple the dispensers 115 with the facility generator 120, the dispensers 115 with a remote facility and/or controller, the facility generator 120 with the POS facility 110, and/or the facility generator 120 with other remote computing systems.

Electrical power may be provided to see POS facility 110 via a grid connection 130. Generally, the grid connection 130 may provide electrical power to the POS facility 110, such as, in the form of high-voltage power (e.g., between 138 kV and 765 kV), sub transmission tower (e.g., between 26 kV and 69 kV), primary power (e.g., between 4 kV and 13 kV), and/or secondary power (e.g., between 120 V and 240 V, as well as other voltages, such as 480 V). Such determination of the appropriate voltage requirements may depend on, for example, the electrical requirements of the POS facility 110, the electrical requirements of other components of the system 100 not shown in the illustrated embodiment, and/or the electrical work requirements of one or more of the dispensers 115. In addition, electrical power supplied by the grid connection 130 may be further divided (i.e., stepped down) as needed.

The facility generator 120, as illustrated, may receive a generator fuel 125 and supply a generator output 155. In some embodiments, the generator fuel 125 may be natural gas, diesel fuel, gasoline, or other hydrocarbon fuel. Alternatively, the generator fuel 125 may be solar energy, wind energy, hydroelectric energy, or other renewable energy form. In the illustrated embodiment, the facility generator 120 is a natural gas generator capable of supplying, for example, up to 3 MW of electrical power as the generator output 155. For instance, the facility generator 120 may be a Dresser Waukesha engine generator model APG 3000. As illustrated, such a generator 120 includes a natural gas powered engine mechanically coupled to a generator such that rotational power supplied to the generator by the engine generates an electrical power output. In some embodiments, the facility generator 120 may provide up to 2846 kW at 60 Hz. In addition, the facility generator 120 may receive natural gas as the generator fuel 125 at between 58 and 87 psig. The facility generator 120 may supply continuous AC power as the generator output 155 at a variety of speeds (e.g. 1200 rpm) and a variety of fuel consumptions (e.g., between 5798 and 6138 BTU/BHP HR (kW)). Of course, other engine generators may be used in the system 100 depending on the size of the system 100, costs associated with the facility generator 120, provisions for generator fuel 125, and required generator output 155.

In alternative embodiments, the facility generator 120 may be an energy storage system utilizing wind turbines and compressed air to generate electricity. For example, the facility generator 120 may include one or more wind turbines driving one or more air compressors to generate compressed (e.g., high pressure) air (or other fluid). The compressed air may be used or stored for later use in driving a motor-generator, which generates electricity at a predetermined power output. The generated electricity may be supplied, therefore, as generator output 155 and may be supplied to a vehicle while the facility generator 120 is decoupled (e.g., electrically) from a main utility grid.

In some embodiments, the facility generator 120 may also provide a heat source which may be used to produce additional energy in the form of, for example, hot water for heating, steamed to run a steam turbine, or other energy source to generate additional electricity. Such co-generation techniques may help increase the efficiency of the facility generator 120. In addition, in certain instances when the full generator output 155 is not required to be supplied to the dispensers 115 through dispenser inputs 150, electrical power may be provided to any number of other locations. For instance, such electrical power may be provided to the POS facility 110, other components of the system 100, and even electrical power grid 130 (e.g., a public power grid).

For example, in some embodiments, the heat produced by the facility generator 120 during electrical power generation may be used to produce additional electricity by a Stirling engine. For example, the Stirling engine may utilize the heat produced from the generator 120 to heat a working fluid (e.g., air or other gas) to generate mechanical work from such heat energy. The Stirling engine in this embodiment may, therefore, include a cycle of compressing cool working fluid, heating the working fluid by heat from the generator 120, expanding the hot working fluid, and cooling the working fluid, before repeating the cycle. The mechanical work of the Stirling engine may be transferred to a generator to produce electricity. As another example, the heat produced by the facility generator 120 (or other heat) may be used to drive a steam engine to produce additional electricity.

As noted above, the generator fuel 125 may be any number of fuel sources. Further, they generator fuel 125 may be derived from any number of waste heat sources, such as, for example, waste heat from nearby existing boilers, engine exhaust, heat stacks, flares burning landfill gases, or the burning of digester gases.

The generator output 125 is electrically coupled to the dispensers 115 through a power bus 140 and the dispenser inputs 150. Thus, the facility generator 120 may provide an independent (e.g., off-grid) power source to the dispensers 115. This power source (e.g., generator output 155) may typically be in the form of alternating current (AC) power. Upon receipt of the generator output power 155, the dispensers 115 may convert such AC power to DC power through, for example, an AC to DC converter 157 located within or integral with each dispenser 115.

Electrical power may be supplied to the vehicle from the dispenser 115 through the dispenser output 160. In some embodiments, the dispenser output 160 may be a shielded cable that couples to the vehicle at a receptacle on the body of the vehicle. The cable may conform to industry standards requirements as appropriate. In some implementations, the dispenser 115 transfers power for a quick charge at a nominal voltage of 480 VDC. In some implementations, the voltage applied to the battery being charged via dispenser output 160 may depend on the battery type and configuration within the vehicle. In some embodiments, the dispenser output 116 may provide a conduit for electrical power as well as two-way data communication between the vehicle and the dispenser 115. For example, the dispenser output 160 may allow for the communication of vehicle specific information to the dispenser 115. This information may include, for example, a type of battery being charged in the vehicle, a maximum voltage and/or current acceptable to the battery, temperature of the battery during charging (e.g., a dynamic temperature), historical information (e.g., historic charge patterns from earlier charge cycles), as well as other vehicle/customer information such as relevant data for transaction settlement. In addition, data may be provided from the dispenser 115 and/or the POS facility 110 to the vehicle through the dispenser output 160. For instance, dynamic power information may be communicated to the vehicle, such as an instantaneous voltage, current, and/or kW output from the dispenser 115 to the battery of the vehicle. Further, purchased retail data, such as videos and/or music, may be downloaded to an entertainment center of the vehicle from the dispenser 115 upon purchase by the customer.

In some embodiments, who the dispenser 115 may provide for dynamic real-time load management, where the use of the total energy available at a given time correlated with the amount of energy a single vehicle can absorb may be determined (e.g., such as a product similar to Fusion provided by Dresser, Inc.). Also, the power bus 140 may be connected to the dispensers 115 such that electrical power provided to the bus 140 from the generator output 155 is time multiplexed. For instance, electrical power may be provided for a set or predetermined time period (e.g., five seconds) and then the electrical power may be stopped for another set or predetermined time period (e.g., 10 seconds). Such idle time in which a particular dispenser 115 is not providing electrical power to a vehicle electrically coupled to the dispenser 115 may have several advantages. For example, the idle time may allow the vehicle battery to cool down below a maximum charging temperature. As another example, the idle time may allow for full electrical power to be supplied to each vehicle electrically coupled to the dispensers 115 in order to more quickly charge the batteries of such vehicles. In other words, while a particular dispenser 115 and vehicle are experiencing an idle time, adjacent dispensers 115 and vehicles may be receiving electrical power through the power bus 140.

In certain embodiments, the dispenser 115 may only provide electrical power to the vehicle through the dispenser output 160 after the output 160 is properly connected to the vehicle (e.g. to a receptacle on the vehicle). Further, the dispenser 115 may stop (e.g., automatically or otherwise) the flow of electrical power through the output 160 to the vehicle if the output 160 becomes disengaged (fully or partially). For example, if a customer attempts to unplug the dispenser output 160 from the vehicle during a charge cycle, the dispenser 115 may cease the flow of electrical power to the vehicle through the dispenser output 160. In particular embodiments, the dispenser 115 may provide a signal to the vehicle through the dispenser output 160 indicating that a charge cycle is ongoing or has started. The vehicle may disable its starting system while such a charge cycle is ongoing. Once the charge cycle is completed, the dispenser 115 may provide another signal to the vehicle indicating that the cycle is finished.

In some embodiments, each dispenser 115 may provide for two separate and independent dispenser surfaces, thereby allowing two independent vehicles to be charged simultaneously or substantially simultaneously. For example, each dispenser service may include a separate dispenser output 160 (as illustrated in FIG. 1). Further, each dispenser surface may include its own controller, electronics, and other components (as described more fully with reference to FIG. 5). The dispenser input 150, in such embodiments, may be two inputs with each input electrically coupled to one of the dispenser surfaces. In other embodiments, there may be just a single dispenser input 150 regardless of the number of dispenser surfaces on the dispenser 115. In such embodiments, the dispenser input 150 may be sized to handle electrical power necessary to recharge two (or more) vehicles at the same time.

Figure 2:
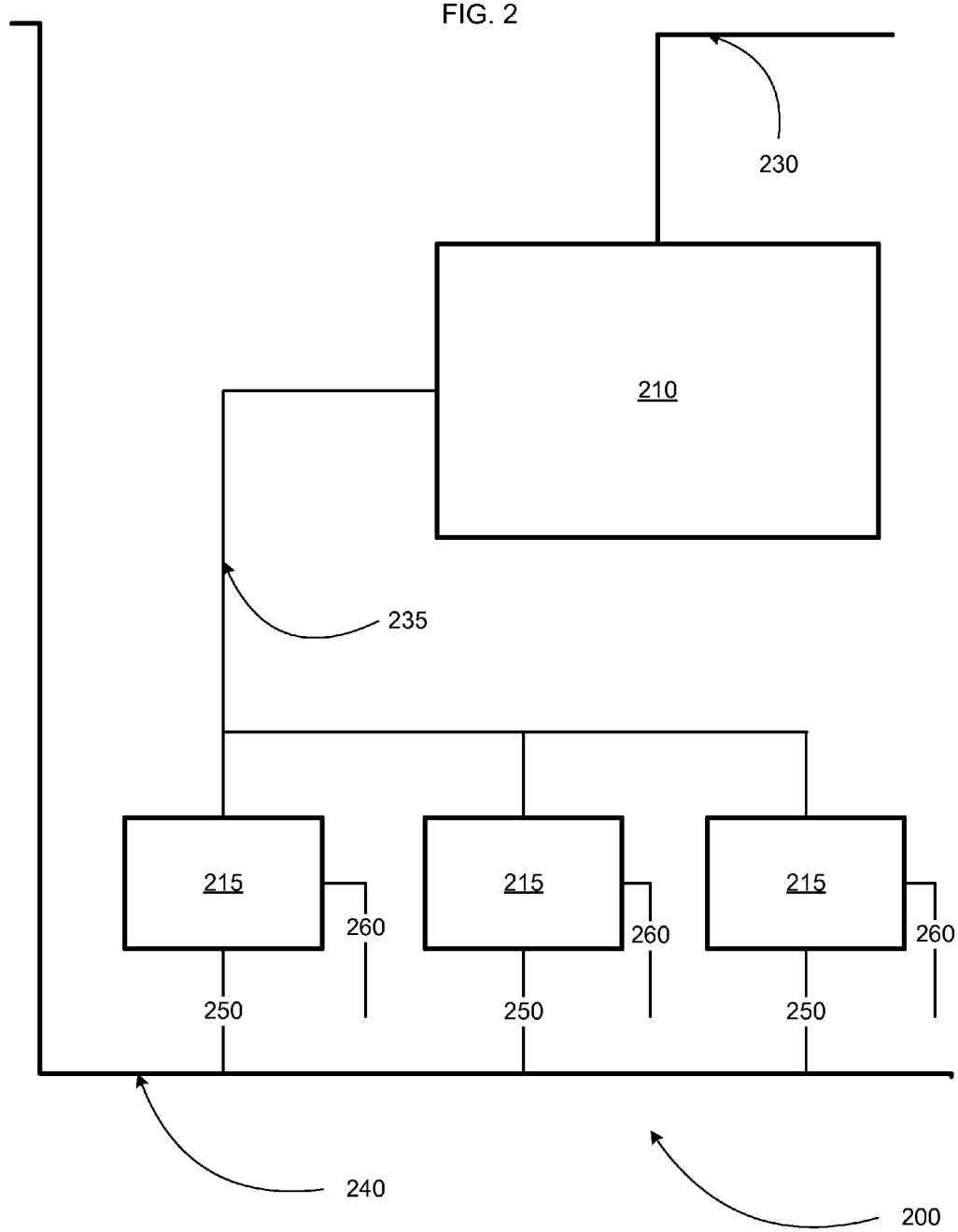
FIG. 2 is a block diagram illustrating one example embodiment of a fueling facility operable to recharge an electric and/or hybrid vehicle utilizing one or more dispenser power generators.

FIG. 2 is a block diagram illustrating one example embodiment of a fueling facility 200 operable to recharge an electric and/or hybrid vehicle utilizing one or more dispenser power generators 215. System 200, as illustrated, may not include a facility generator but instead utilize independent, smaller sized generators located in, at, or integral with each dispenser 215. Reference to dispensers 215, in accordance with this embodiment, may also include reference to a generator that provides electrical power as an output.

As illustrated, system 200 includes a POS facility 210 electrically coupled to a power grid 230 and communicably coupled to the dispensers 215 through a communication link 235. The POS facility 210, the power grid 230, and the communication link 235 may, in some embodiments, be substantially similar to those same components as described with reference to system 100 and FIG. 1. In the illustrated embodiment of system 200, however, the dispensers 215 may be distinct from the dispensers 115 shown in system 100. For example, each dispenser 215 may be a standalone apparatus that functions to generate electrical power at power levels required to recharge a battery of an electric and/or hybrid vehicle, provide such power to the vehicle through a dispenser output 260, and retain functionality to operate as a fuel dispenser (e.g., received transaction data, provide transaction confirmation visually and/or auditory lay, offer additional retail goods and/or services, as well as provide a user interface for a customer to complete all such transactions).

System 200 includes a generator input 240 that supplies fuel (e.g., natural gas, bio gas, hydrogen, waste heat fuel, diesel fuel, gasoline, or other hydrocarbon or renewable fuel source) to each dispenser 215 through dispenser inputs 250. The generator input 240 may does receive fuel through a conduit from an on-site and/or off-site source and provide fuel to each dispenser 215 through the appropriate fittings, valves, and other conduit apparatus.

Turning particularly to the dispenser 215, the illustrated embodiment of the dispenser 215 may include an electrical generator sized to provide electrical power through the dispenser output 260 to recharge a vehicle electrically coupled to the dispenser 215. In some embodiments, the dispenser 215 may be capable of generating between 100 and 400 kW of electrical power to recharge the vehicle. In another example embodiment, such electrical power may be produced at the dispenser 215 through a fuel cell located at or in the dispenser 215. Further, each dispenser 215 may include multiple fuel cells depending on the power requirements of each vehicle and/or vehicles to be recharged.

In specific embodiments, the dispenser 215 may include a waste heat generator that converts heat energy into electrical power using, for example, an organic Rankine cycle. Waste heat sources may include engine exhaust, heat stacks, and the burning of landfill and/or digester gases. Thus, power generated by the dispenser 215 may be virtually "free" power, utilizing heat energy from a waste source. In some embodiments, the dispenser 215 may provide a nominal output of 125 kW electrical power to the vehicle. For example, as a waste heat generator, the dispenser 215 may receive saturated steam generated by a waste heat process provided to the dispenser 215 through the generator input 240 at approximately 250° F. and 30 psi. The flow rate of the steam may be approximately 3200 pounds per hour. Such conditions of the input steam may provide for roughly 125 kW electrical output of the dispenser 215. In another embodiment, pressurized hot water generated by a waste heat process may be supplied to the dispenser 215 through generator input 240 at an inlet temperature of approximately 249° F. and a flow rate of 250 gpm. Such conditions may provide for electrical output of the dispenser 215 of approximately 125 kW.

In another example embodiment, each dispenser 215 may include a microturbine generator. The microturbine generator may receive natural gas from the generator input 240 and produce electrical power through a generator mechanically coupled to the microturbine. The dispenser 215 may also provide for co-generation in such embodiments. For example, the dispenser 215 may generate both electrical and thermal energy thereby increasing the overall efficiency of the dispenser 215. Such efficiencies of the dispenser 215 while operating in a combined heat and power (CHP) mode may reach over 80%.

Figure 3:
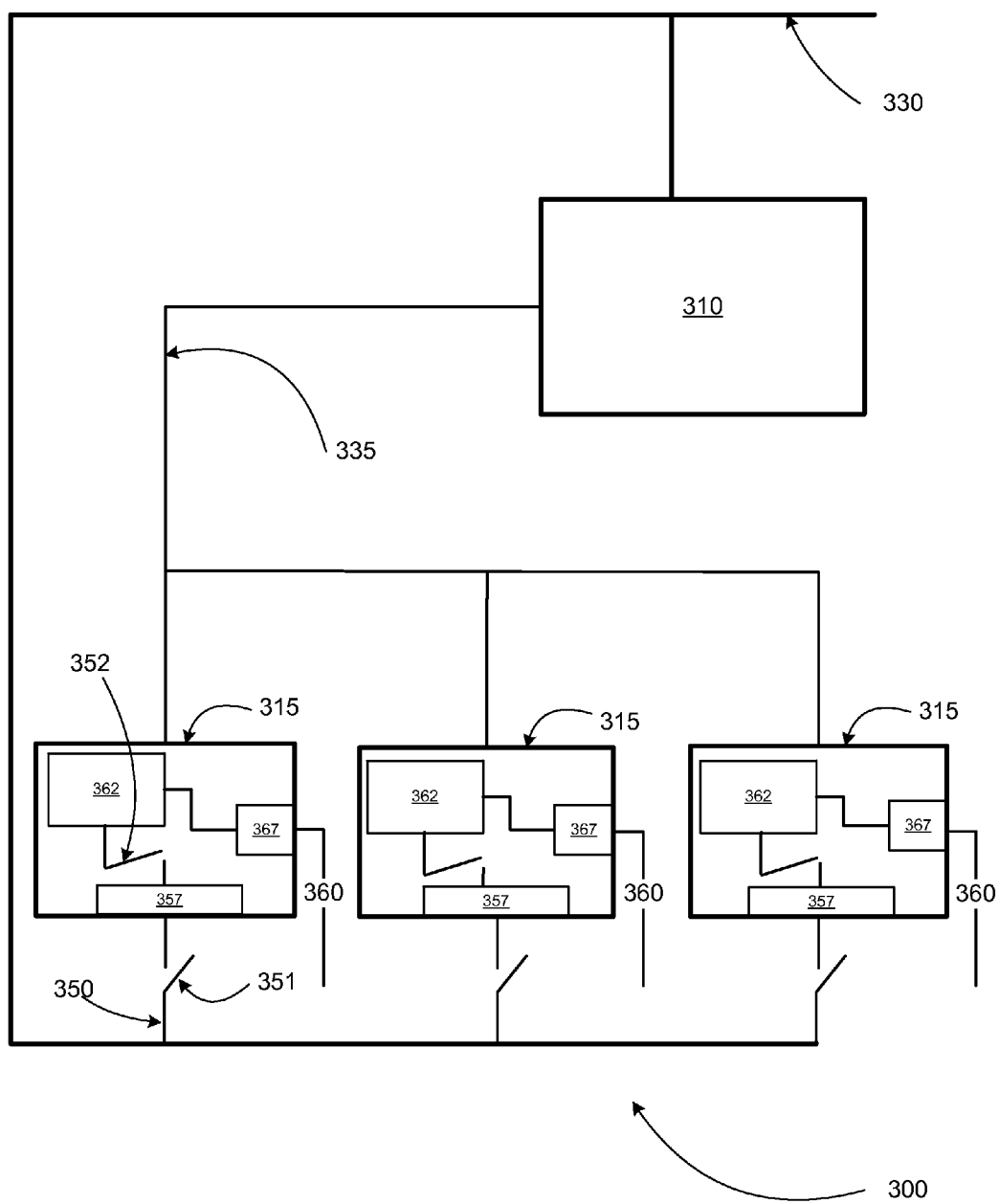
FIG. 3 is a block diagram illustrating one example embodiment of a fueling facility operable to recharge an electric and/or hybrid vehicle utilizing one or more dispenser power generators.

FIG. 3 is a block diagram illustrating one example embodiment of a fueling facility 300 operable to recharge an electric and/or hybrid vehicle utilizing one or more dispensers 315 including a battery array. In the illustrated embodiment, system 300 includes a POS facility 310 electrically coupled to a power grid 330 and communicably coupled to one or more dispensers 315 through a communication link 335. In some embodiments of system 300, the POS facility 310, power grid 330, and communication link 335 may be substantially similar to those same components as described with reference to previously described embodiments.

In the illustrated embodiment of system 300, the power grid 330 is also electrically coupled to each of the dispensers 315 through independent dispenser inputs 350. Thus, electrical power, such as high-voltage power, may be provided to each dispenser 315 from the grid 330. In other embodiments, electrical power, such as high-voltage power, may be supplied to each dispenser 315 through an energy source independent of the grid 330. For example, electrical power may be supplied to each dispenser 315 by a renewable energy source, such as hydroelectric power, solar power, nuclear power, or other power source.

In some specific embodiments, the electrical power supply to each dispenser 315 through the power grid 330 may be secondary power (e.g., between 120 V and 240 V). In other words, electrical power supplied to each dispenser 315 by the power grid 330 may be a stepped-down voltage from high power transmission lines. In other embodiments where the electrical power provided to the dispenser is 315 is high-voltage power, each dispenser 315 may include one or more transformers to step down the high-voltage to a lower voltage (such as voltages between 120 V and 240 V, as well as 480 VAC).

In the illustrated embodiment of the dispenser 315, one or more battery arrays 362 may be enclosed within each dispenser 315 and/or electrically coupled with the dispenser 315. Each battery array 362 may include multiple batteries. In the illustrated embodiment, each battery within the battery array 362 may, itself, be recharged by secondary power (i.e., low power recharge), such as 120 VAC, 15 amps. The battery array 362 in each dispenser 315 may work in conjunction to recharge a vehicle electrically coupled to the dispenser 315 at a higher power (e.g., between 100 and 400 kW). The batteries in each battery array 362 may be electrically coupled within the array in series and/or parallel. Such batteries may be lithium ion batteries, lithium oxygen batteries, lead acid batteries, redox batteries, or other battery technology.

The batteries in each battery array 362 of any particular dispenser 315 may be recharged at any appropriate time, such as, for example, throughout a 24-hour period until a maximum acceptable charge is reached, during off-peak hours (e.g., at night), or during periods in which the battery array 362 is not discharging to recharge a vehicle through the dispenser output 360. In other words, recharging of the battery array 362 may be timed to take advantage of the cheapest electrical power available from the power grid 330 or may occur continuously as needed to recharge vehicles as they enter system 300 to be recharged from the dispensers 315.

In some embodiments, one or more of the batteries in each battery array 362 may be a vehicle battery previously used in an electric and/or hybrid vehicle. For example, such vehicle batteries may come to an end of their useful life after they have lost approximately 30% of their capacity, thereby making them unusable in vehicles. Such batteries may, however, have a second useful life when coupled within a battery array 362 in the dispensers 315. Such batteries, while unable to reach their maximum desirable capacity, may still be recharged and discharged to provide electrical power to a vehicle through the dispenser output 360. Further, should electric and/or hybrid vehicle batteries be standardized, thereby rendering nonstandard existing batteries unusable in new vehicles, such batteries may be utilized in the aforementioned battery array 362.

As illustrated in FIG. 3, each battery array 362 may be electrically coupled with an AC/DC converter 357 and a DC/DC converter 367. The DC/DC converter 367 is electrically coupled with the dispenser output 360. In some embodiments, low power recharge voltage (i.e., 120 VAC) may be supplied to the AC/DC converter 357 through the dispenser input 350 from the grid 330. The AC/DC converter 357 may then transform the alternating current to a direct current that is supplied to charge the battery array 362. The battery array 362 may thus discharge its stored energy through to a vehicle battery pack coupled to the dispenser output 360. In some embodiments, such as when the voltage of the battery array 362 does not match a voltage of the vehicle battery pack, the DC/DC converter 367 may transform (e.g., step up or step down) the voltage of the battery array 362 to match the voltage of the vehicle battery pack.

As further illustrated in FIG. 3, there may be one or more switches electrically coupled between components of the fueling facility 300. For instance, a switch 351 may be coupled between the dispenser inputs 350 and the AC/DC converter 357. Further, a switch 352 may be electrically coupled between the AC/DC converter 357 and the battery array 362. Thus, when switches 351 and 352 are closed, the battery array 362 may be charged. In some embodiments, the battery array 362 may be configured to discharge (e.g., to a vehicle battery pack) when the switch 352 is open, thereby electrically decoupling the battery array 362 from the grid 330.

Figure 4:
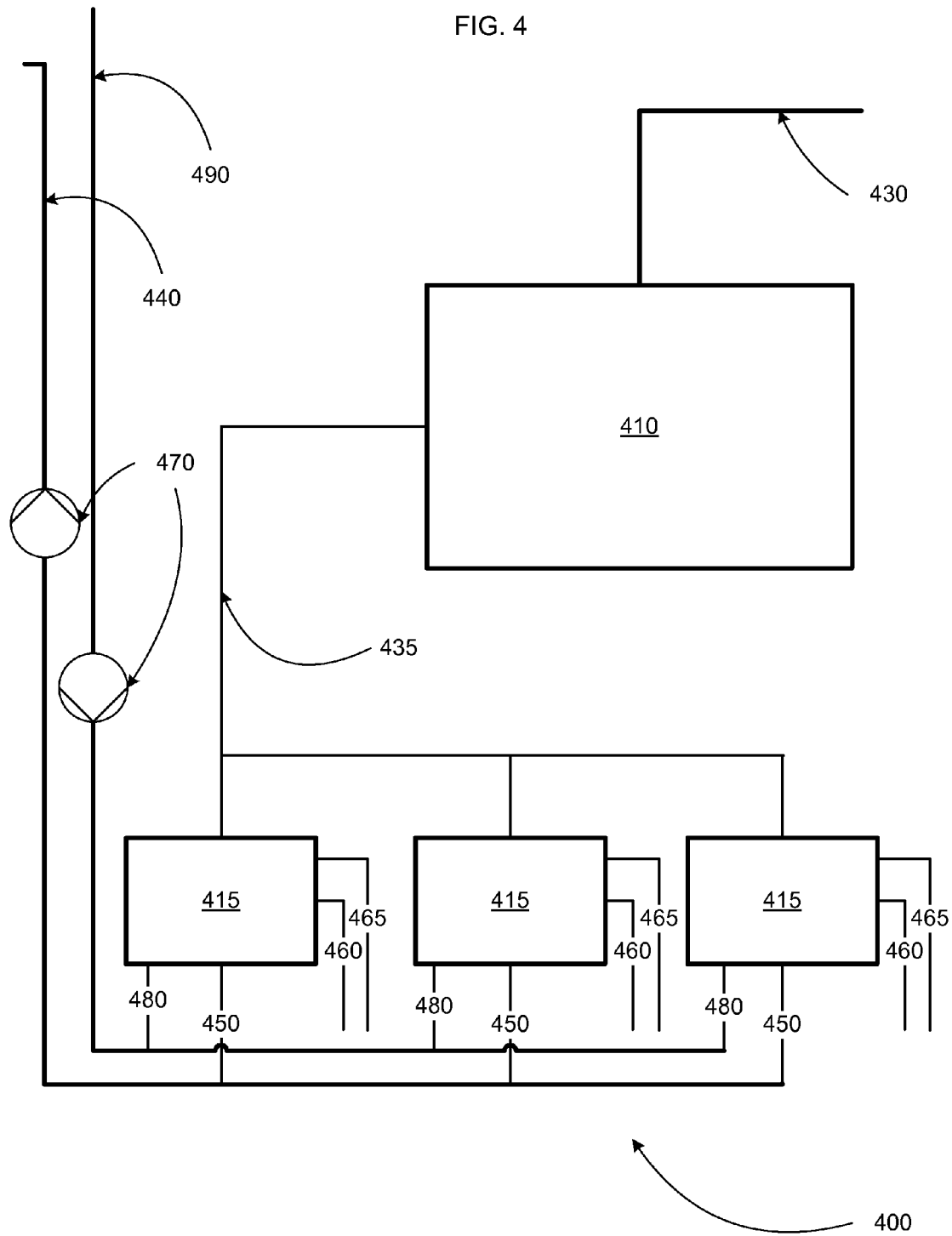
FIG. 4 is a block diagram illustrating one example embodiment of a fueling facility operable to recharge an electric and/or hybrid vehicle utilizing a battery fluid exchange.

FIG. 4 is a block diagram illustrating one example embodiment of a fueling facility operable to recharge an electric and/or hybrid vehicle utilizing a battery fluid exchange. For example, flow batteries can be recharged by exchanging the positive and negative electrolyte stored therein, or in auxiliary tanks with recharged electrolytes. In the case of reduction-oxidation (redox) batteries, electrolytes are typically pumped through two parts of a reaction cell separated by a thin ion exchange membrane. During the charging process, electrical energy causes a chemical reduction reaction in one electrolyte and an oxidation reaction in the other. During this redox process, selected ions are passed through the ion exchange membrane to complete the reaction. The process can be reversed by pumping the two electrolytes across the respective portions of the reaction cell, thus releasing electrical energy through the electrodes.

Referring again to FIG. 4, system 400 includes electrolyte dispensers 415 which operate similar to conventional gasoline dispensers, except that they are configured to dispense two electrolytes simultaneously via dispenser outputs 460 (e.g., using two feed conduits). Dispensers 415 are further configured to extract the discharged electrolytes from the electrolyte tanks within the vehicle and/or battery via dispenser inputs 465. The discharged electrolytes are transferred via fluid outputs 480 to facility tanks or reservoirs, not shown, for storage and recycling. Recycled, recharged, or charged electrolytes are supplied to dispensers 415 via fluid inputs 450. As illustrated in FIG. 4, fluid inputs 450 are coupled to dispensers 415 and pump 470. One or more pumps 470 are coupled to electrolyte storage tanks, not shown, by fluid conduit 440 to draw the electrolytes from the storage tanks.

As illustrated, system 400 also includes a POS facility 410 electrically coupled to a power grid 430 and communicably coupled to the dispensers 415 through a communication link 435. The POS facility 410, the power grid 430, and the communication link 435 may, in some embodiments, be substantially similar to those same components as described with reference to system 100 and FIG. 1.

In some implementations, dispenser 415 may be configured to dispense one electrolyte at a time through dispenser outputs 460. In some implementations, dispenser 415 may include a pump unit, not shown, for drawing the discharged electrolytes out of the vehicle tanks and/or battery. In addition, some implementations of dispenser 415 may include a power conduit for transferring power to the vehicle pump to initiate the fluid transfer. Further, in some implementations, fluid outputs 480 are coupled directly to fluid conduit 490 and gravity forces the discharged fluids into the recycling tanks, e.g., tanks located underground.

In some embodiments, system 400 further includes an A.C. to D.C. converter for transferring power from one of the power sources described above to one or more reaction cells configured to recycle/recharge the discharged electrolyte. Implementations utilizing alternative power sources, engine-generator sets, and/or turbines have the added advantage of avoiding a significant increase in demand on the utility grid. In some implementations, utility power is used during off peak periods to recharge/recycle the discharged electrolyte. In addition, or alternatively, discharged electrolyte may be transported off-site for storage and recycling at a remote facility. Preferably, the remote recycling facility is sufficiently close to a power plant or an alternative energy source so as to minimize any negative effects on the current utility infrastructure. A combination of the above methods and other known load balancing techniques are contemplated to be within the scope of this disclosure.

In some embodiments, the features disclosed above with respect to FIGS. 3 and 4 are combined to provide a dispenser 415 including a redox battery array for providing high levels of D.C. power (e.g., between 100 and 400 kW) to recharge vehicle battery packs. The arrangement and configuration of dispenser inputs 450, dispenser outputs 480, pumps 470, and fluid conduits 440, 490 may be substantially similar to those same components as described above with respect to FIG. 4. Instead of dispensing and drawing the electrolyte fluids from the vehicles, however, the power generated by exchanging the fluids in the dispenser battery array would be transferred to the vehicle battery pack via dispenser outputs 360, 460. The recharging/recycling of the discharged fluids collected from the dispenser battery arrays may then be handled in substantially the same ways as discussed above with respect to FIG. 4. In some implementations, the reaction cells within each of the dispensers 415 may be used to recycle the electrolyte fluids during periods of low use (which advantageously typically coincide with non-peak demand periods with regard to the utility grid), for example by supplying power from one of the power sources discussed above and reversing the flow of fluids through the dispenser.

FIG. 5 is a block diagram illustrating one example embodiment of a fuel (e.g., electricity, charged fluid) dispenser 500. In some embodiments, dispenser 500 may be substantially similar to one or more of the dispensers 115, 215, 315, and/or 415 as described above. Alternatively, the dispenser 500 may include different functionality and/or components as compared to the dispensers shown in FIGS. 1-4.

The dispenser 500 may receive a dispenser input 540 and provide a dispenser output 560 that provides electrical power to an electric and/or hybrid vehicle in order to recharge the battery of the vehicle. In some embodiments, the dispenser input 540 may be three-phase AC power, such as for example, received from a facility generator such as the generator 120 shown in FIG. 1. The AC power received through dispenser input 540 may be high-voltage or stepped down through a voltage transformer. In other embodiments, the dispenser input 540 may be three-phase AC power received from a power grid, such as the power grid 330 shown in FIG. 3. This AC power may also be high-voltage and or stepped down voltage to, for example, 120 V and/or 240 V. In other embodiments, the dispenser input 540 may be a hydrocarbon fuel, such as natural gas, diesel, propane, gasoline, or other fuel. For example, the dispenser input 540 may receive such fuel as described in FIG. 2. In other embodiments, the dispenser input 540 may be a charged fluid (e.g., liquid, gel, or other fluid), such as the fluid described in FIG. 4. For example, such fluid received through dispenser input 540 may be received from a storage tank located at or remote to a fueling facility, a mobile fluid storage vehicle, such as a tanker truck, or other location.

The dispenser input 540 is received at a power module 510 of the dispenser 500. The power module 510 is operable to receive the dispenser input 540 and manipulate the input 540 in order to provide a predetermined level of electrical power to the vehicle electrically coupled to the dispenser 500 through dispenser output 560. For example, the power module 510 may receive high-voltage three-phase AC power from a generator, such as a 3 MW generator and convert such power to a lower voltage DC power source. The power module 510, therefore, may include one or more AC to DC converters to provide DC power (e.g., 100 kW to 400 kW) to the vehicle.

In other embodiments, the power module 510 may be a generator, operable to receive a fuel, such as natural gas, diesel, or other fuel, through dispenser input 540 and provide DC power using the fuel. In other embodiments, the power module 510 as a generator may receive a heated fluid (e.g., steam, hot water, or other heated fluid) and generate electrical power from the heated fluid. For example, the power module 510 may be a waste heat generator operable to provide between 100 and 400 kW electrical power from a motor/generator located in the power module 510. The power module 510 may also be a microturbine operable to provide between 100 and 400 KW electrical power using natural gas as a power source.

In other embodiments, the power module 510 may include one or more batteries arranged in one or more arrays that may be charged (e.g., in parallel, in series, continuously, at intervals, or otherwise) from a power grid electrically coupled to the dispenser input 540. For example, the power grid may provide the dispenser input 540 secondary voltage AC power (e.g., 120 V to 240 V) in order to charge the batteries in the battery array. The battery arrays in power module 510 may then be controllably discharged in order to provide electrical power to the vehicle through dispenser output 560. In some examples, one of more of the batteries may be lithium-ion batteries, lithium oxygen batteries, lead acid batteries, nanotube-enhanced ultracapacitor batteries, or otherwise.

In other embodiments, the power module 510 may include one or more apparatus to provide an electrical charge to a fluid (e.g., liquid, gel, or other fluid). The fluid may then be provided through dispenser output 560 to one or more batteries on the vehicle and exchanged with non-charged fluid in the batteries. For example, in some embodiments, such batteries may be metal-air batteries that may utilize an ionic liquid to provide a charge for the battery. Once the charge in the ionic liquid is depleted, due to, for example, operation of the vehicle, the ionic liquid may be replaced with charged ionic liquid in order to provide further operation for the vehicle. The power module 510 may include, in addition to such apparatus available to charge the ionic liquid, further components such as one or more pumps, one or more storage tanks, one or more valves and/or other fittings, that allow the non-charged ionic liquid to be removed from the vehicle and the charged ionic liquid to be provided to the vehicle through dispenser output 560.

The dispenser 500 also includes a control module 520. At a high-level, the control module 520 is operable to provide all control functions for the dispenser 500, such as, for example, starting and stopping the recharging of a vehicle electrically coupled to the dispenser 500, transactions involving the payment of goods and/or services, including the payment for fuel provided by the dispenser 500 to the vehicle, and a host of other functions. For example, the control module 520 may provide for a communication interface between the dispenser 500, the vehicle, and/or any other remote system, such as a POS facility, or remote payment verification center. In other words, the control module 520 may establish a communication interface to the vehicle and/or battery in the vehicle through the dispenser output 560, thereby allowing two-way communication (or one-way communication) between the dispenser 500 and the vehicle.

The control module 520 may also provide for transaction functionality. For example, the control module 520 may include any number of processors, input devices (e.g., keypads, microphones, video cameras, or other input devices), output devices (e.g., displays, speakers, printers, or other output devices), and/or other dispenser modules. For example, the control module 520 may include a security module that ensures that transaction information (e.g., payment card numbers, PIN numbers, customer information, or other confidential information) is handled in a secure manner between the dispenser 500, a POS facility, and/or payment verification center.

In some embodiments, the control module 520 may allow for payment of fuel (e.g., electrical power, a charged fluid) through one or more payment techniques. For example, the control module 520 may allow for a cash payment, including a cash prepayment, as well as payment through one or more of a credit and/or debit card using preauthorization of the card. For example, the control module 520 may allow for dispensing of the fuel prior to actual payment. For instance, the user may be asked for some identifying information (e.g., information stored on a driver's license and/or ID card) prior to dispensing of the fuel. Once the fuel has been dispensed, the customer may be asked for a cash payment or other form of payment. Once sufficient payment has been received at the dispenser 500, such identifying information may be discarded. If insufficient payment is received, the identifying information may be kept for security purposes and/or to provide to authorities.

The control module 520 may also allow for payment and/or communication between the dispenser 500 and a mobile device (e.g., a mobile phone, PDA, or other mobile communication device) as well as a transponder (RFID). For example, the customer may have a key transponder or other type of transponder located on the vehicle that is automatically recognized by the control module 520 and payment for the fuel dispensed by the dispenser 500 may be automatically processed. Payment and transaction settlement can also be done by utilizing two-way data communication through the cable connecting the vehicle to the dispenser 500.

In some embodiments, the control module 520 may provide for sales and/or marketing information to the customer. For example, the control module 520 may inform the customer of one or more goods or services for sale at the fueling facility at which the dispenser 500 is located. In other examples, the control module 520 may be operable to transmit a message to a consumer's communication device, such as a cell phone or e-mail communication device, indicating that sufficient fuel has been provided to the vehicle. For example, while the dispenser 500 recharges the battery of the vehicle, the consumer may step away from the dispenser 500 and engage in other retail activities. The control module 520 may then notify the consumer through a wireless communication once the recharge is complete. In other embodiments, the control module 520 may automatically recognize the vehicle as the vehicle approaches the dispenser 500. The dispenser 500 may be readied (e.g., a generator within or electrically coupled to the dispenser 500 may be started) in time to recharge the vehicle.

The dispenser 500 also includes an output module 530. The output module 530 may receive fuel (e.g., electrical power and/or a charged fluid) from the power module 510 and provide such fuel to the vehicle through the dispenser output 560. In some embodiments, the output module 530 may include storage location for the dispenser output 550. For example, the dispenser output 516, as a cable or shielded set of wires, may be retracted (e.g., fully or partially) into the module 530 during periods of non-use. In some aspects, a retractor mechanism may be power assisted (e.g., with springs, biasing elements, actuators, or otherwise) to reduce a force required by a customer to extend and/or retract the dispenser output 516.

A number of embodiments have been described. Nevertheless, it will be understood that various modifications may be made without departing from the spirit and scope of the disclosure. For example, any one of the foregoing embodiments may utilize fuel cells as a power source. As another example, one or more dispensers in accordance with the present disclosure may be mounted and/or contained on a mobile trailer that may be transported to one or more vehicles at a particular location, such as, for example a parking lot, sales lot, or other location. As another example, an electricity charge station in accordance with the present disclosure could be combined with a compressed natural gas (CNG) refilling station. The power from the charge station, such as from a gas engine generator, may be used to drive an on-site CNG compressor when the gas engine has spare power. As another example, in embodiments of the present disclosure using one or more battery arrays in a dispenser, electrical power used to recharge such batteries may instead be used to produce hydrogen through electrolysis. The hydrogen may then be mixed with natural gas to drive a gas engine generator. As another example, the power generation may be complemented with solar panels, converting solar power to electricity on the charge station. The canopy (roof) covering the motorists from the rain, etc., is an ideal space for solar panels. Accordingly, other embodiments are within the scope of the present disclosure.

What is claimed is:

1. A charge transfer system including a charge transfer apparatus having an input and an output, the charge transfer system comprising:
   - an AC/DC converter of the charge transfer apparatus coupled to the input of the charge transfer apparatus, the AC/DC converter configured to receive off-grid AC power at a first power level;
   - a charge storage device of the charge transfer apparatus coupled to the AC/DC converter, the charge storage device configured to receive charge at the first power level and to transfer charge to the output of the charge transfer apparatus at a second power level, the second power level being greater than the first power level; and
   - a point of sale apparatus configured to facilitate a commercial and/or retail transaction involving the transfer of the charge to the output of the charge transfer apparatus and to receive power from the grid while the AC/DC converter is receiving the off-grid AC power.

2. The charge transfer system of claim 1, wherein the charge storage device comprises a battery array configured to be controllably discharged through the output of the charge transfer apparatus.

3. The charge transfer system of claim 2, wherein the battery array comprises multiple batteries electrically coupled in a series-parallel arrangement.

4. The charge transfer system of claim 1, wherein the output of the charge transfer apparatus is a first output, the charge transfer apparatus further comprising a second output.

5. The charge transfer system of claim 4, wherein the charge storage device is configured to transfer charge to the first and second output in parallel using time multiplexing.

6. The charge transfer system of claim 5, further comprising a generator coupled in parallel to the charge storage device and operable to transfer charge to the charge storage device.

7. The charge transfer system of claim 1, wherein the charge transfer apparatus is configured to be selectively connected and disconnected from the utility power grid, and wherein the charge storage device is configured to transfer charge to the output of the charge transfer apparatus when the charge transfer apparatus is disconnected from the utility power grid.

* * * * *